United States Patent [19]

Hayashi et al.

[11] Patent Number: 5,473,415
[45] Date of Patent: Dec. 5, 1995

[54] IMAGE FORMING APPARATUS HAVING A CONVERTER FOR IMAGE DATA CHARACTERISTICS

[75] Inventors: Kimiyoshi Hayashi, Soka; Kenichi Suda, Yokohama; Kazuhiko Hirooka, Tokyo, all of Japan

[73] Assignee: Canon Kabushiki Kaisha, Tokyo, Japan

[21] Appl. No.: 402,987

[22] Filed: Mar. 13, 1995

Related U.S. Application Data

[63] Continuation of Ser. No. 314,449, Sep. 28, 1994, abandoned, which is a continuation of Ser. No. 73,626, Jun. 8, 1993, abandoned, which is a continuation of Ser. No. 611,964, Nov. 13, 1990, abandoned, which is a division of Ser. No. 144,047, Jan. 14, 1988, Pat. No. 4,989,039.

[30] Foreign Application Priority Data

| Jan. 19, 1987 | [JP] | Japan | 62-9461 |
| Jan. 19, 1987 | [JP] | Japan | 62-9462 |
| Jan. 19, 1987 | [JP] | Japan | 62-9463 |
| Jan. 19, 1987 | [JP] | Japan | 62-9464 |
| Jan. 19, 1987 | [JP] | Japan | 62-9465 |

[51] Int. Cl.⁶ ............................... G03G 21/00
[52] U.S. Cl. .................. 355/208; 355/214; 358/475
[58] Field of Search ............... 355/69, 208, 214, 355/215, 219, 228; 358/475, 480, 481, 443

[56] References Cited

U.S. PATENT DOCUMENTS

| 2,357,809 | 9/1944 | Carlson | 355/210 |
| 3,649,114 | 3/1972 | Vlach et al. | 355/313 |
| 4,105,321 | 8/1978 | Urso | 355/228 |
| 4,122,409 | 10/1978 | Marlett et al. | 331/94.5 |
| 4,360,261 | 11/1982 | Kohyama | 355/228 |
| 4,620,236 | 10/1986 | Tanaka et al. | 358/475 |
| 4,626,096 | 12/1986 | Ohtsuka et al. | 355/209 |
| 4,646,249 | 2/1987 | Tanioka et al. | 355/209 X |
| 4,680,646 | 7/1987 | Ikeda et al. | 346/160 X |
| 4,697,910 | 10/1987 | Kasuya | 346/160 X |
| 4,709,250 | 11/1987 | Takeuchi | 346/160 |
| 4,725,854 | 2/1988 | Ohtsuka et al. | 346/160 X |
| 4,782,398 | 11/1988 | Mita | 358/298 X |
| 4,864,419 | 9/1989 | Saito et al. | 358/298 X |
| 4,870,499 | 9/1989 | Suzuki et al. | 358/456 X |
| 4,888,636 | 12/1989 | Abe | 358/80 |
| 4,922,335 | 5/1990 | Outa et al. | 358/80 |

FOREIGN PATENT DOCUMENTS

| 3409406 | 9/1984 | Germany . |
| 3512060 | 10/1985 | Germany . |
| 61-50425 | 7/1979 | Japan . |
| 55-117164 | 9/1980 | Japan . |
| 56-86776 | 7/1981 | Japan | 358/475 |
| 58-65450 | 4/1983 | Japan | 355/217 |
| 61-120581 | 6/1986 | Japan . |
| 61-132964 | 6/1986 | Japan . |

OTHER PUBLICATIONS

Dattilo et al; "Variable Intensity Scanner Calibration System"; IBM Technical Disclosure Bulletin; vol. 21, No. 9, Feb. 1979, pp. 3546 and 3547.

*Primary Examiner*—Fred L. Braun
*Attorney, Agent, or Firm*—Fitzpatrick, Cella, Harper & Scinto

[57] ABSTRACT

An image forming apparatus responsive to environmental conditions has an image forming device for forming a dot image on a recording member. The image forming device includes exposure apparatus for exposing the recording member. A detector detects a humidity condition of the apparatus, and control circuitry regulates the amount of light of the exposure apparatus in accordance with an output of the detector. The control circuitry is adapted, when the humidity detected by the detector is lower than a predetermined value, to select an amount of light of the exposure apparatus larger than that in the case where the humidity is higher than the predetermined value.

31 Claims, 17 Drawing Sheets

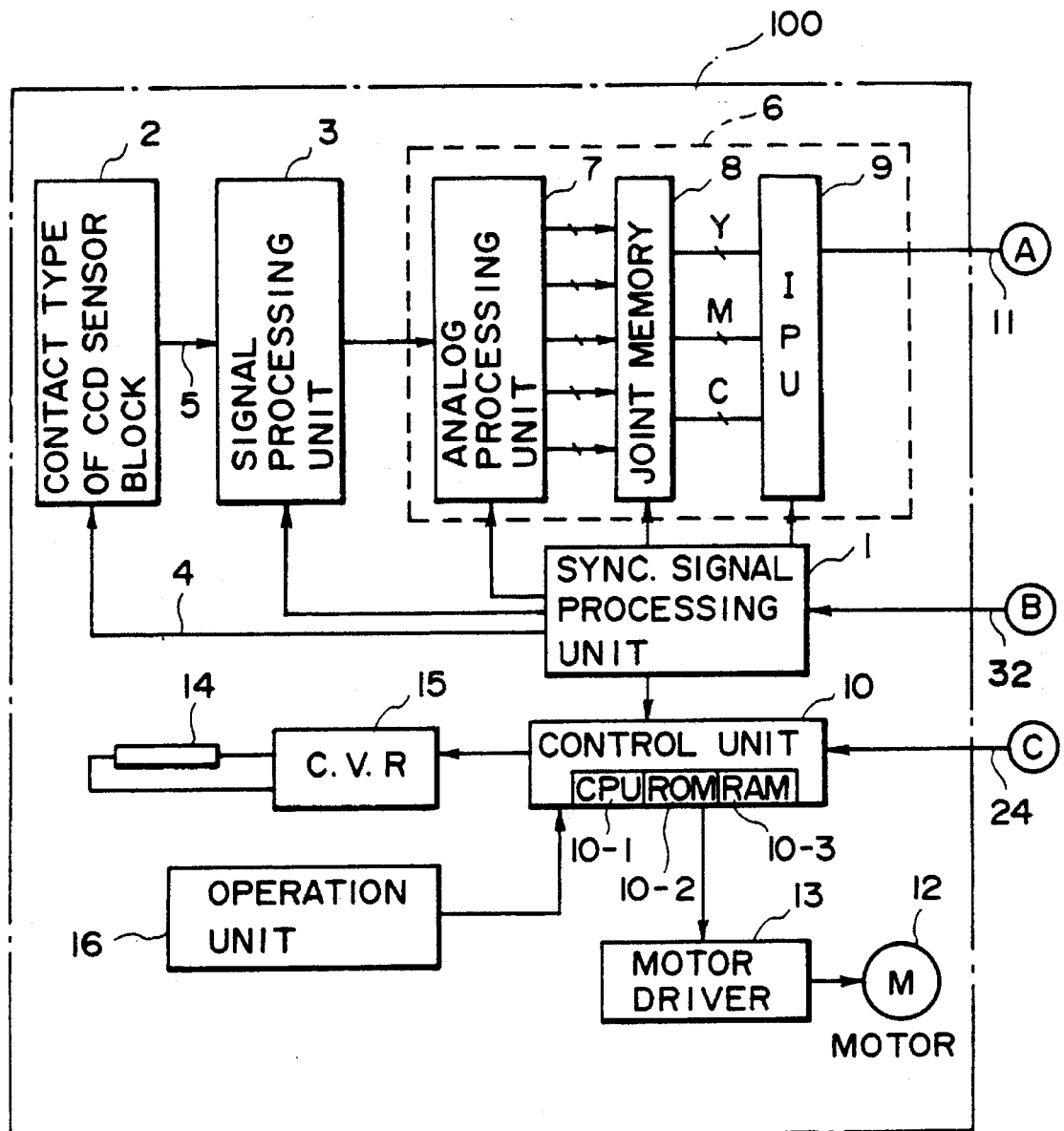
F I G. 1A

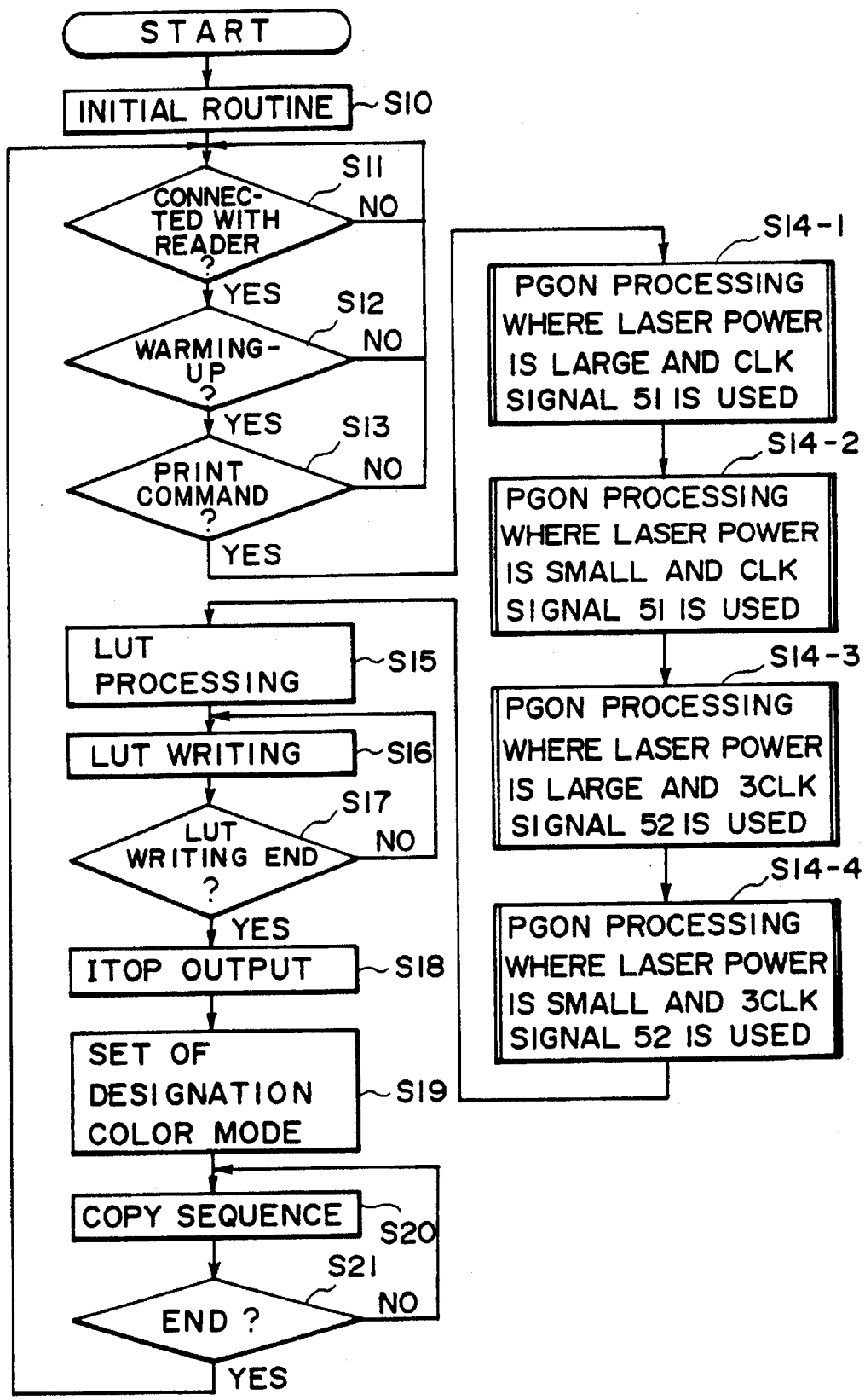
F I G. 5

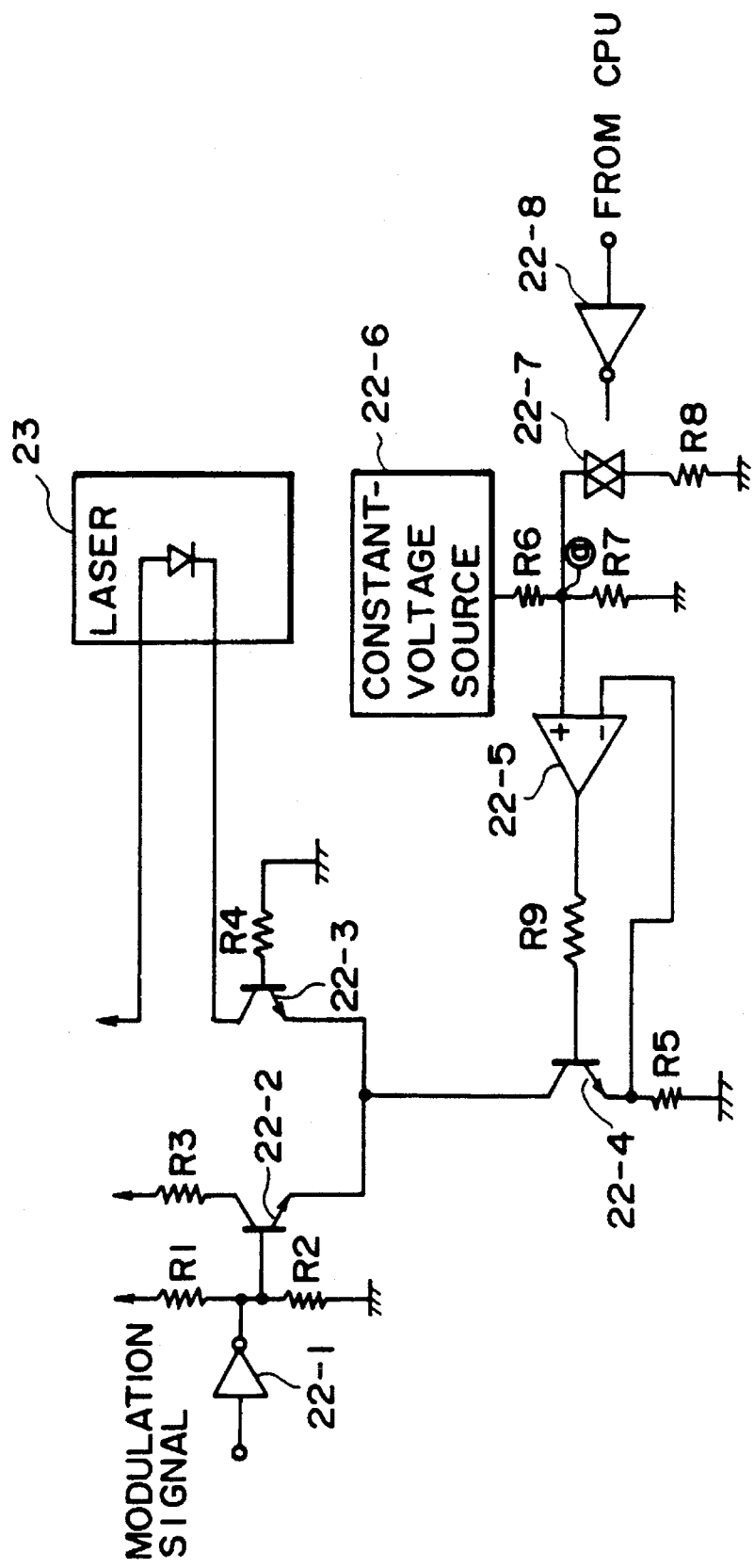
F I G. 15

IMAGE FORMING APPARATUS HAVING A CONVERTER FOR IMAGE DATA CHARACTERISTICS

This application is a continuation of application Ser. No. 08/314,449, filed Sep. 28, 1994, now abandoned, which is a continuation of application Ser. No. 08/073,626, filed Jun. 8, 1993, now abandoned, which is a continuation of application Ser. No. 07/611,964, filed Nov. 13, 1990, now abandoned, which is a divisional of application Ser. No. 07/144,047, filed Jan. 14, 1988, which is now U.S. Pat. No. 4,989,039.

BACKGROUND OF THE INVENTION

1. Field of the Invention

The present invention relates to an apparatus for forming an image on a recording member.

2. Related Background Art

There is already known an apparatus for forming an image, through an electrophotographic process, by charging and exposing a photosensitive member to form an electrostatic latent image thereon and developing said latent image.

The sensitivity of a photosensitive member varies with the lapse of time or by a change in the environmental conditions such as temperature and humidity. In an apparatus for forming a dot-pattern image on a photosensitive member by means of a laser beam or the like, there is often employed a method of modulating each pixel with a predetermined area rate. However, in such method, control has been accomplished with predetermined area rates for the start and stop of laser beam emission, since the points of said start and stop are inevitably distant in time. It is known that time-dependent changes occur in the potential $V_{OO}$ of the photosensitive member at the start of laser beam emission and the potential $V_{FF}$ at the end of laser beam emission, as shown FIG. 13.

FIG. 13 shows the surface potential in as a function of the grid voltage VG of the primary charger. Since the surface potential $V_{OO}$ varies from A to B in time while the surface potential $V_{FF}$ varies from C to D, it is necessary to vary the grid voltage from 700 V to 1000 V in order to attain a same value of $V_c=(V_{OO}-V_{FF})=420$ V. However it has been difficult to precisely cover a voltage range from 200 V to 1000 V in a high-voltage unit.

Also the performance of the developing unit varies with the ambient conditions. Particularly the image density is affected by the humidity, and it is often not possible to obtain an optimum density.

SUMMARY OF THE INVENTION

In consideration of the foregoing, an object of the present invention is to provide an improved image forming apparatus.

Another object of the present invention is to provide an image forming apparatus capable of forming an image with satisfactory tonal rendition regardless of changes in the environmental conditions.

Still another object of the present invention is to provide an image forming apparatus capable of forming an image with satisfactory tonal rendition regardless of time-dependent changes in the characteristics of the recording member.

Still another object of the present invention is to provide an image forming apparatus capable of forming a color image with constant color reproduction.

The foregoing and still other objects of the present invention will become fully apparent from the following description.

BRIEF DESCRIPTION OF THE DRAWINGS

FIGS. 1A and 1B are block diagrams of a color copying machine embodying the present invention;

FIG. 5 is a flow chart of the control sequence of a control unit in a printer unit;

FIG. 14-2 is a chart showing the relation between the duration of a binary pulse signal and the intensity of light emission from a laser;

FIG. 15 is a circuit diagram of a laser driver circuit 22;

DETAILED DESCRIPTION OF THE PREFERRED EMBODIMENTS

Now the present invention will be clarified in detail by embodiments thereof shown in the attached drawings.

Figures 1, 14:
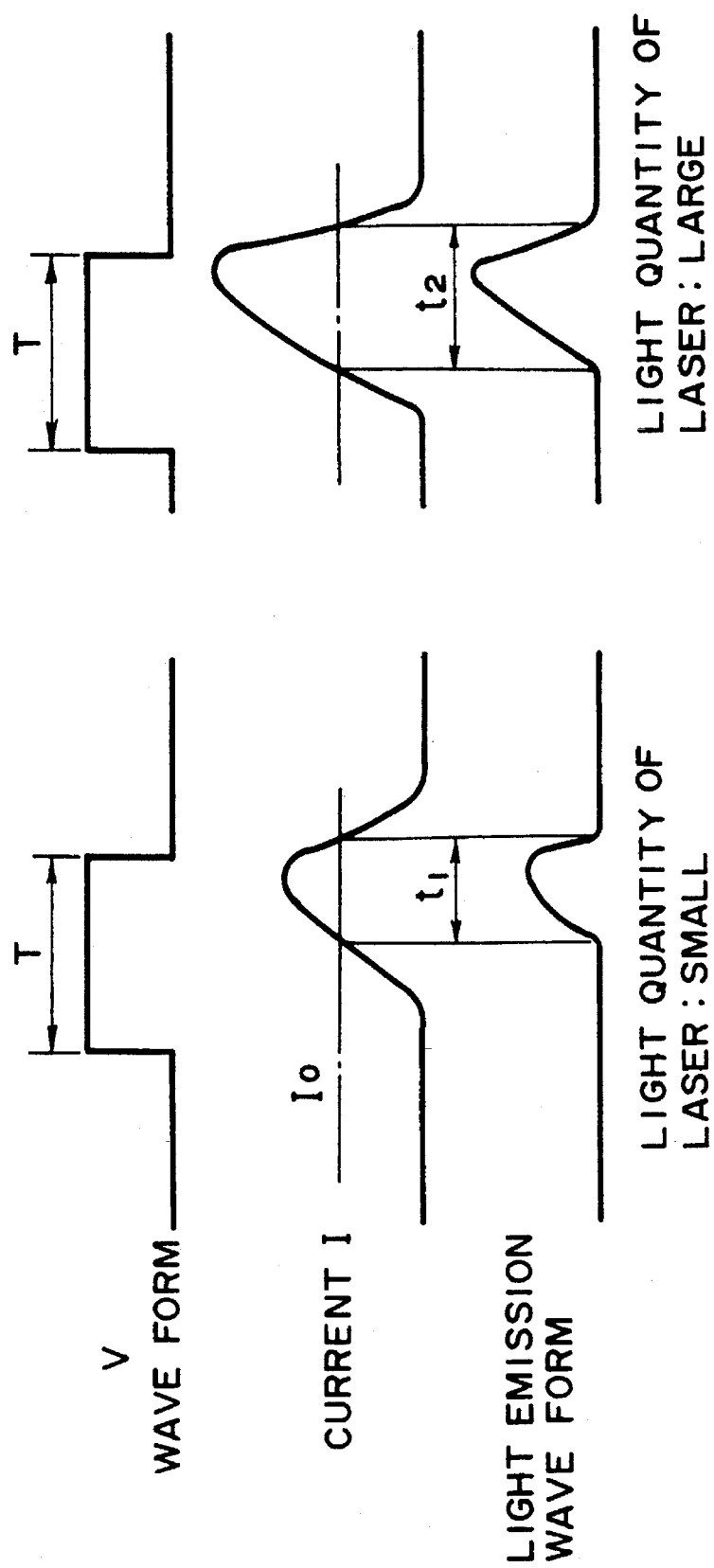
FIG. 14-1 is a chart showing the relation between electric power supplied to a laser and light emission therefrom.
Figures 2, 14:
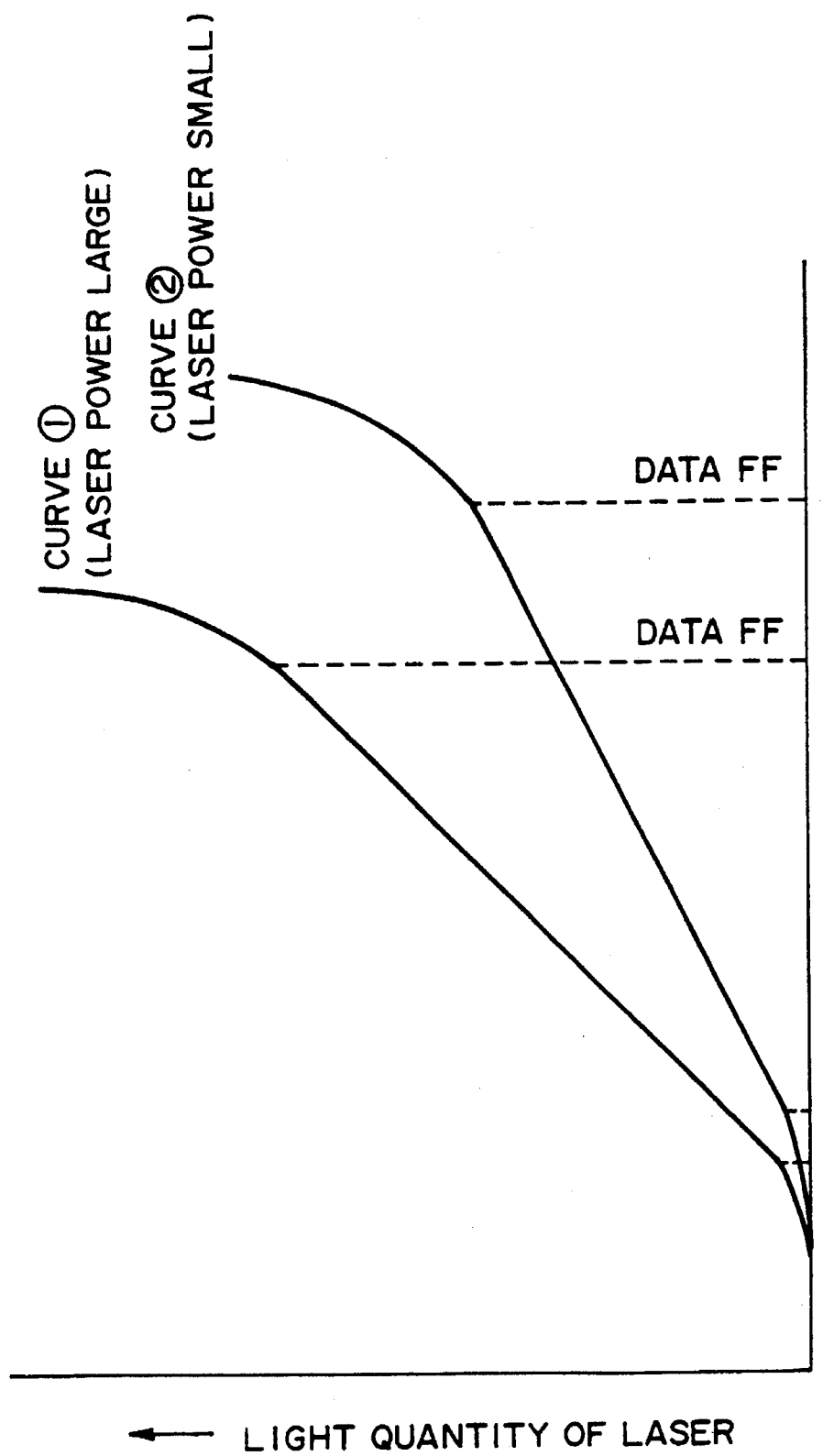

Explanation of a block diagram of a color copying machine (FIG. 1)

FIG. 1 is a block diagram of a color copying machine embodying the present invention.

A synchronization signal processing unit 1 generates various timing signals in synchronization with a horizontal synchronization signal 32 supplied from a tone control circuit 21 in response to a signal from a beam detector 20 of a printer unit 200. A contact-type CCD sensor block 2 reads and converts an original image into an electrical signal 5, in response to a reader horizontal synchronization signal RHSYNC and a drive signal 4 generated by the synchronization signal processing unit 1. A signal processing unit 3 is provided for signal shaping in order to prevent attenuation of high-frequency components of the signal 5.

In an image processing block 6, the image signal from the signal processing unit 3 is at first supplied to an analog processing unit 7. As the contact-type CCD sensor block 2 time-sequentially releases signals of cyan (C), green (G) and yellow (Y) constituting each pixel, the analog processing unit 7 at first separates said signals into respective colors of C, G and Y. Since a printer unit 200 is provided with developing stations for yellow (Y), magenta (M) and cyan (C), said image signals are converted into red signals (R), green signals (G) and blue signals (B) by calculations C—G=B and Y—G=R. Said R, G and B signals thus obtained, linearly varying in voltage in relation to the image density, are converted into 8-bit digital density signal by an A/D converter. These processes are conducted in the analog processing unit 7.

The image signal of each color digitized in the analog processing unit 7 is divided into 5 channels which are mutually unsynchronized. Thus, said channels are synthesized by a jointing memory 8 to obtain unified image data. The image data synthesized and converted into Y, M and C signals in the jointing memory 8 are supplied, in synchronous manner, to an image processing unit (IPU) 9 for effecting a shading correction and a masking correction. Then a desired color signal is selected by a control unit 10 of the reader unit 100, and an 8-bit color signal after predetermined color conversion is supplied from the IPU 9 to the printer unit 200 through a data line 11.

Separately the control unit 10 activates a motor driver 13 to control a motor 12 for scanning the original image, and also controls a CVR unit 15 for controlling an exposure lamp 14 and an operation unit 16 for providing copy instructions and other operations.

There is also provided an unrepresented mode selector switch for achieving a sharp reproduction from a letter original and a tonal reproduction from a photograph original, and the information of such mode is supplied from the operation unit 16 to the control unit 10 and then to the printer unit.

In response to said information, the control unit of the printer controls a selector of a binary digitizing circuit to be explained later, according to the signal from a CPU 25-1.

The image data 11 from the reader unit 100 are supplied to a tone control circuit 21 of the printer unit 200. The tone control circuit 21 has a function of synchronizing the image clock signal of the reader unit 100 with the image clock signal of the printer unit 200, and a function of correlating the image data with the reproduced color density in the printer unit 200. The output signal from the tone control circuit 21 is supplied to a laser driver 22 for driving a laser element 23, thereby effecting image formation.

Figure 17:
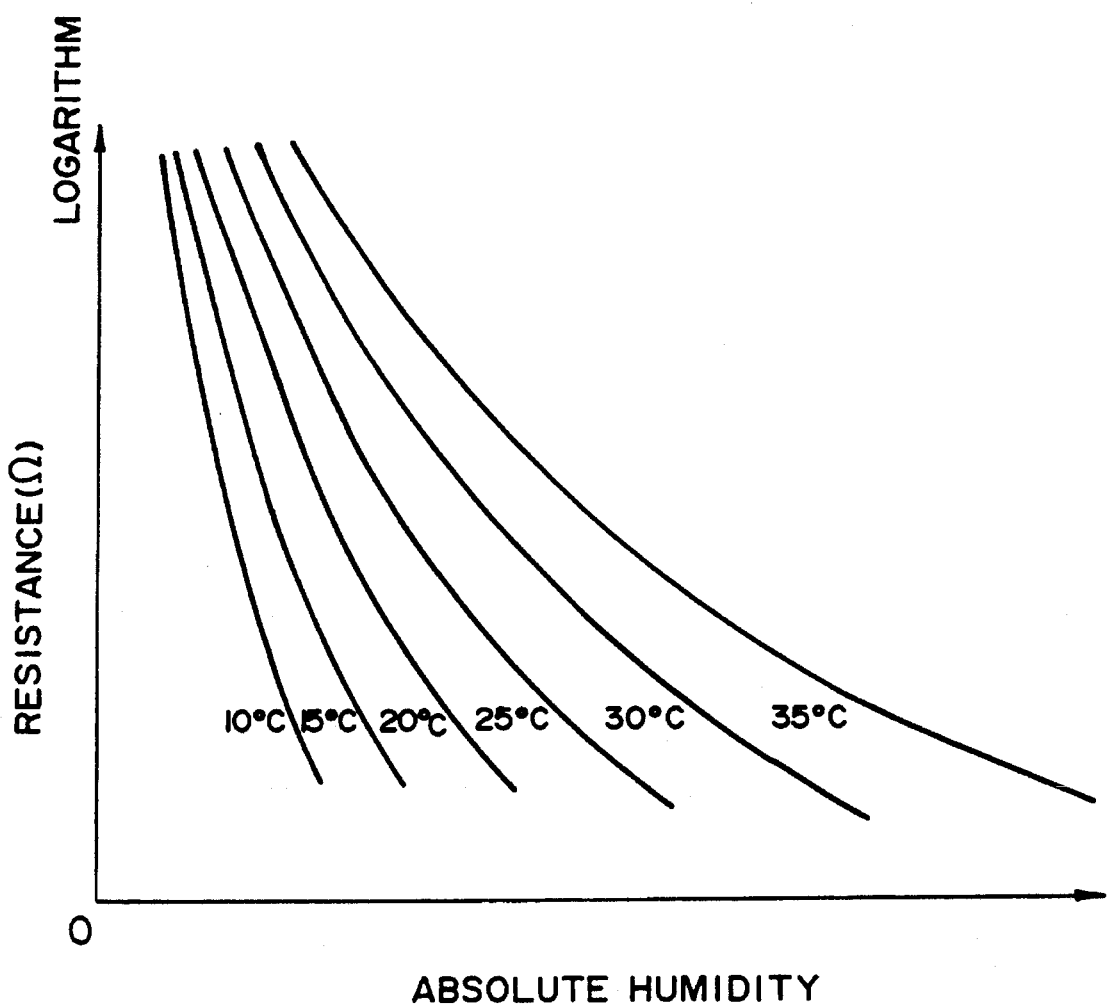
FIG. 17 is a chart showing characteristics of a humidity sensor.

The control unit 25 of the printer communicates with the reader unit 100 through a communication control line 24 and controls various units of the printer 200. Also are provided a potential sensor 26 for detecting the charge on a photosensitive member 29, and a potential measuring unit 27 for converting the output signal of the potential sensor 26 into a digital signal for supply to the control unit 25. A potential signal supplied to the control unit 25 is fetched by the CPU 25-1 thereof for use in a control operation to be explained later. Also an image top signal ITOP indicating the leading end of the image from a sensor 28 is also supplied to the control unit 25 for controlling the recording operation. Also, signals from a humidity sensor 98 and a temperature sensor 99, for correcting the developing characteristics, are supplied through an A/D converter 25-3 of the control unit 25. The humidity sensor 98 in the present embodiment varies its resistance according to the relative humidity, as shown in FIG. 17, showing the resistance in ordinate and the relative humidity in abscissa. Thus the relative humidity AH, indicating the ratio of the amount of vapor in the air to the saturated amount of vapor at each temperature is given by:

$$AH=f(T, H)$$

wherein T is temperature and H is the indication of the humidity sensor. Said function f is generally represented by a third-order function. Thus the relative humidity is determined by obtaining said T and H from the output signals of the temperature sensor 99 and the humidity sensor 98, converting said signals into digital signals by the A/D converter 25-3 of the control unit and processing the thus obtained digital signals.

The relative humidity thus determined is used in a control operation to be explained later.

Figure 8:
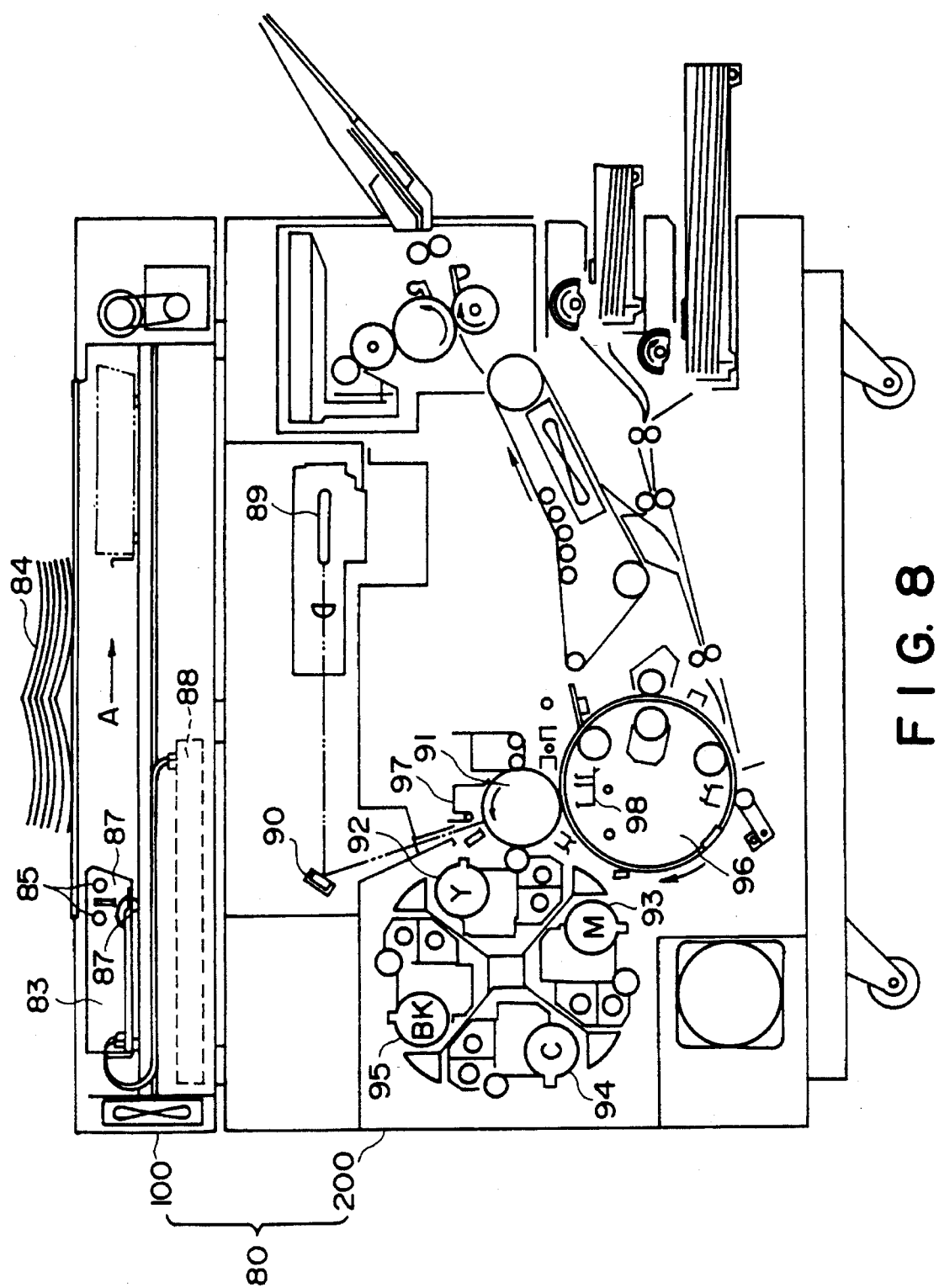
FIG. 8 is a cross-sectional view of a color copying machine.

FIG. 8 is a cross-sectional view of a copying machine utilizing the contact-type CCD sensor of the present embodiment.

The copying machine 80 is composed of a reader unit 100 and a printer unit 200. An original scanning unit 83 is adapted to move in a direction A for reading the image of an original document 84 placed on an original support plate, simultaneously turning on an exposure lamp 85 in the scanning unit 83. The light reflected from the original is guided to a converging rod lens array 86 and focused on a contact-type color CCD sensor 87, consisting of a staggered arrangement of 5 CCD chips of 1024 pixels each, wherein each pixel has a size of 62.5 μm (1/16 mm) and is divided into three areas of 15.5×62.5 μm each, having respectively cyan, green and yellow filters.

The optical image focused on the color CCD sensor 87 is converted into electric signals of respective colors, which are subjected to a process to be explained later in an image processing block 88. The color-separated image signals released from said block 88 are supplied to the printer 200 for image printing.

The color image signals from the reader 100 are used, after pulse width modulation etc., for driving the laser element. The laser beam modulated according to the image signals is deflected into a scanning motion by a polygon mirror 89 rotated at a high speed, then reflected by a mirror 90 and irradiates the surface of a photosensitive drum 91 to effect dot exposure thereon corresponding to the image. A horizontal scanning line of the laser beam corresponds to a horizontal scanning line of the image and has a width of 1/16 mm in the present embodiment. As the photosensitive drum 91 is rotated in a direction indicated by an arrow at a constant speed, a two-dimensional image is exposed thereon by a main scanning achieved by the movement of said laser beam and a sub scanning achieved by said rotation of the photosensitive drum 91. The photosensitive drum 91 is uniformly charged in advance by a charger 97, and a latent image is formed by the exposure on said photosensitive drum. A latent image corresponding to the signal of a particular color is developed in one of developing units 92–95 corresponding to said color.

For example, in response to a first scanning operation of the original image in the color reader unit, a dot image of the yellow component of said original image is exposed on the photosensitive drum 91, and is developed by the yellow developing unit 92. The yellow image thus obtained is transferred onto a sheet wound on a transfer drum 96, by means of a transfer charger 98 at the contact point of the photosensitive drum 91 and the transfer drum 96, whereby a yellow toner image is formed on said sheet. The same process is repeated for magenta, cyan and black colors, and these color images are superposed on said sheet to obtain a four-color toner image.

Figure 9:
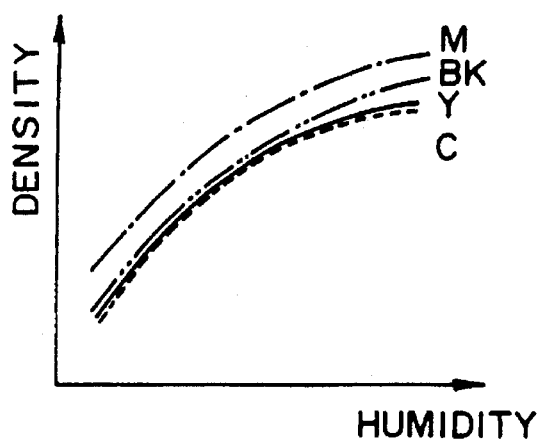
FIG. 9 is a chart showing the relation between print image density and humidity under a same image forming condition.
Figure 10:
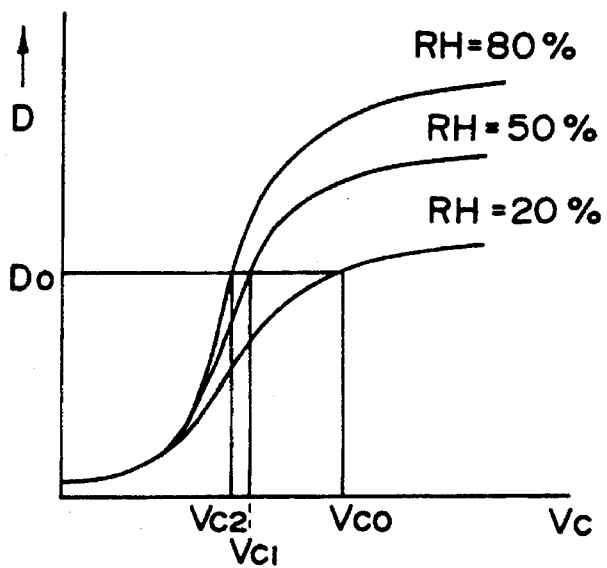
FIG. 10 is a chart showing the relation between print image density and surface potential of a photosensitive member under the same image forming condition.
Figure 11:
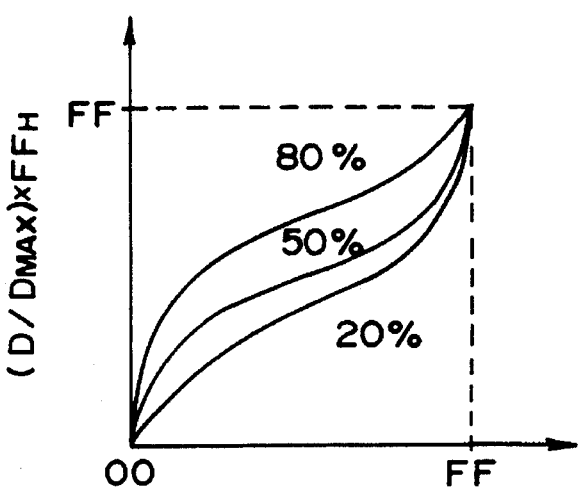
FIG. 11 is a chart showing the relation, stored in a ROM in advance, between density data and data measured with a potential sensor.

As the characteristics of the developer in the developing units is dependent on humidity, the image densities under the same image forming conditions vary as a function of humidity as shown in FIG. 9. Also FIG. 10 shows the image density as a function of the surface potential of the photosensitive drum, in which humidity is taken as a parameter.

Consequently the required target potential for a fixed target image density $D_0$ is $V_{C2}$, $V_{C1}$ or $V_{C0}$ respectively for a relative humidity of 80%, 50% or 20% (in the present embodiment $V_{C2}$=150 V, $V_{C1}$=240 V and $V_{C0}$=300 V). It should be noticed that the image density characteristic to humidity relationship shown in FIG. 9 varies for each color, and thus the required target potential also varies for each color.

Figure 13:
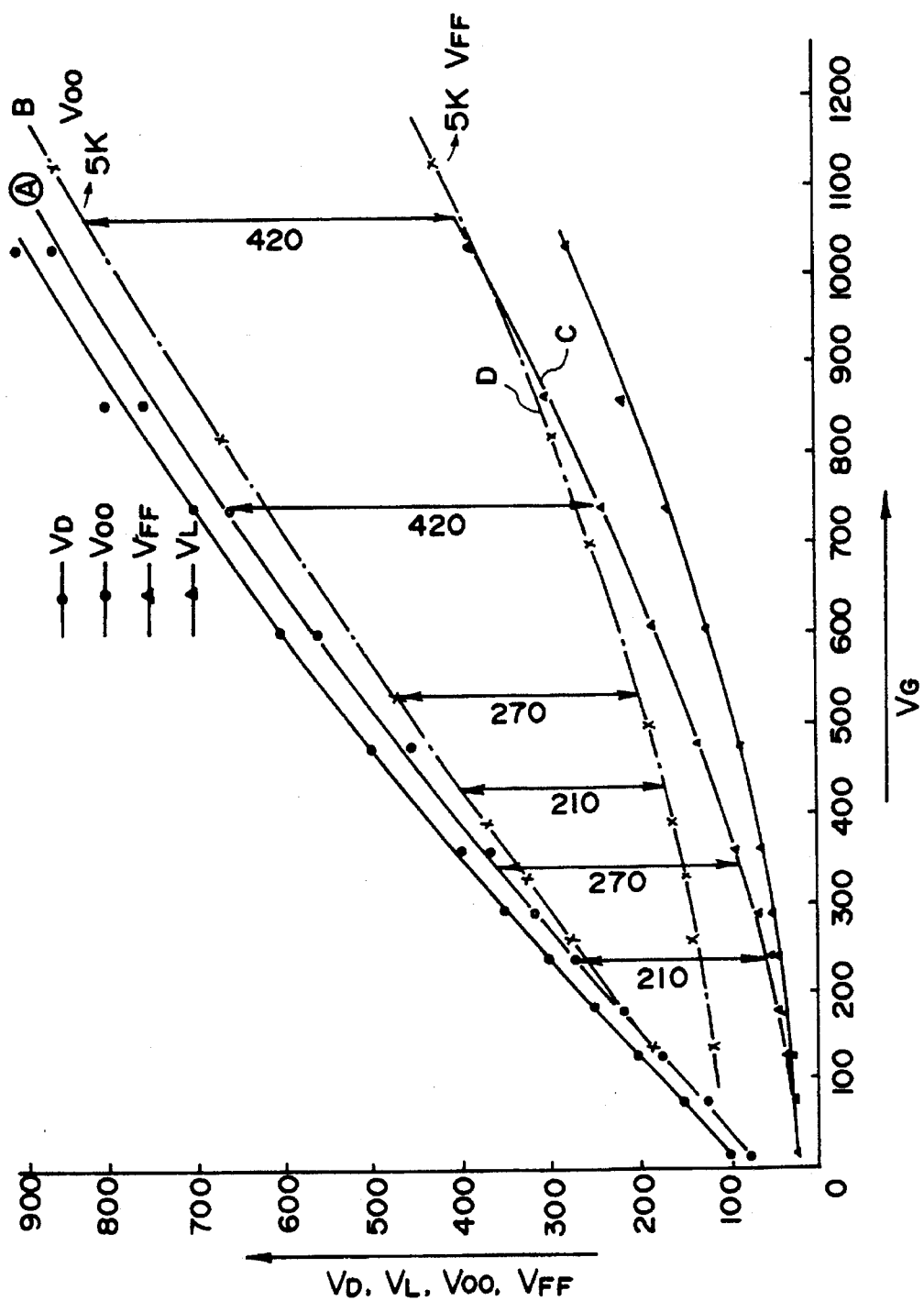
FIG. 13 is a chart showing the relation between the surface potential of a photosensitive member and control voltage, also indicating time-dependent changes in potential.

On the other hand, in the potential characteristic of the photosensitive member shown in FIG. 13, a contrast equal to or higher than 250 V requires an elevated grid voltage which is unable to provide a necessary precision of control, so that the laser power has to be suitably switched. In the present embodiment, therefore, the laser power is switched at the relative humidity of 50%, and is selected lower or higher respectively above or below the humidity of 50%.

Figure 2:
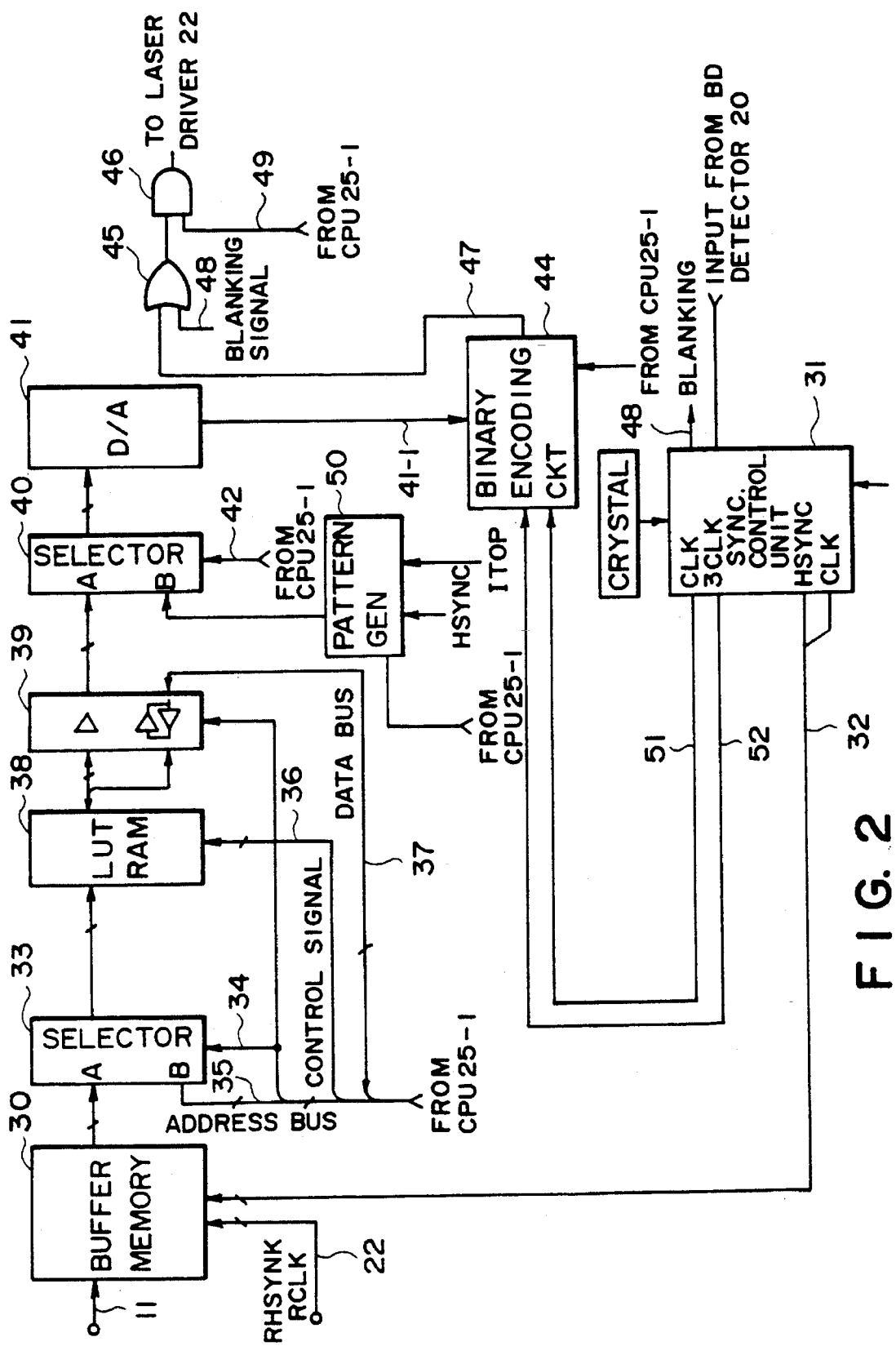
FIG. 2 is a block diagram of a tone control circuit.
Figure 3:
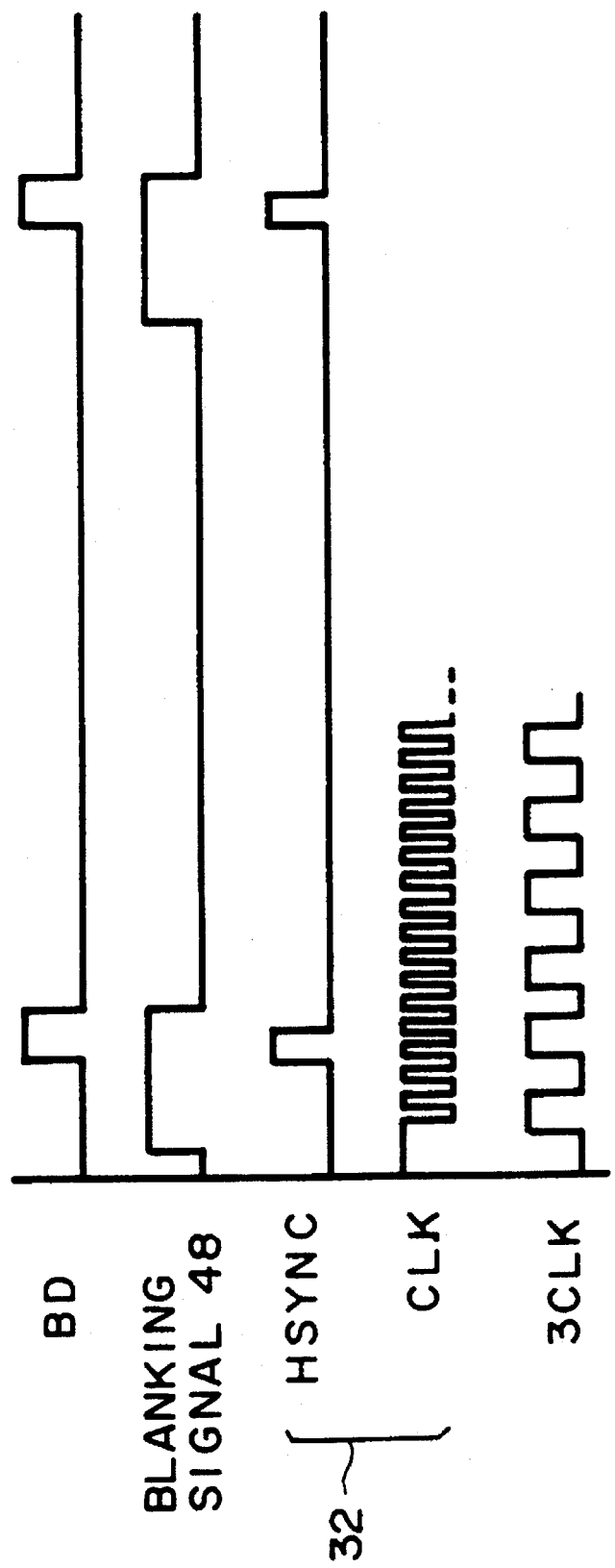
FIG. 3 is a timing chart showing signals in a synchronization control block.

Explanation of tone control circuit (FIGS. 2 and 3)

FIG. 2 is a block diagram of the tone control circuit 21.

The 8-bit image data 11 released from the IPU 9 of the reader 100 is supplied to a buffer memory 30 in synchronization with a synchronization signal RHSYNC and an image clock signal RCLK from the synchronization signal process unit 1, and the image signal stored in the buffer memory 30 is read therefrom in synchronization with signals HSYNC and CLK 32 from a synchronization control unit 31. In this manner the image signal is adjusted to the difference in synchronization and speed between the reader 100 and the printer 200, and is supplied to a selector 33.

When a selection signal 34 from a CPU 25-1 of a control unit 25 selects the input A of the selector 33, the image signal is supplied to the address terminal of a look-up table RAM (LUTRAM) 38. When the CPU 25-1 selects the reading mode of the RAM 38 by a control signal 36, data corresponding to the address input are released from the RAM 38. The released data are supplied to a selector 39, and further supplied to a next selector 40 by the aforementioned selection signal 34. When a selection signal 42 of the selector 40 selects the input A, said data are supplied to a D/A converter 41 for conversion into an analog signal.

Figure 16:
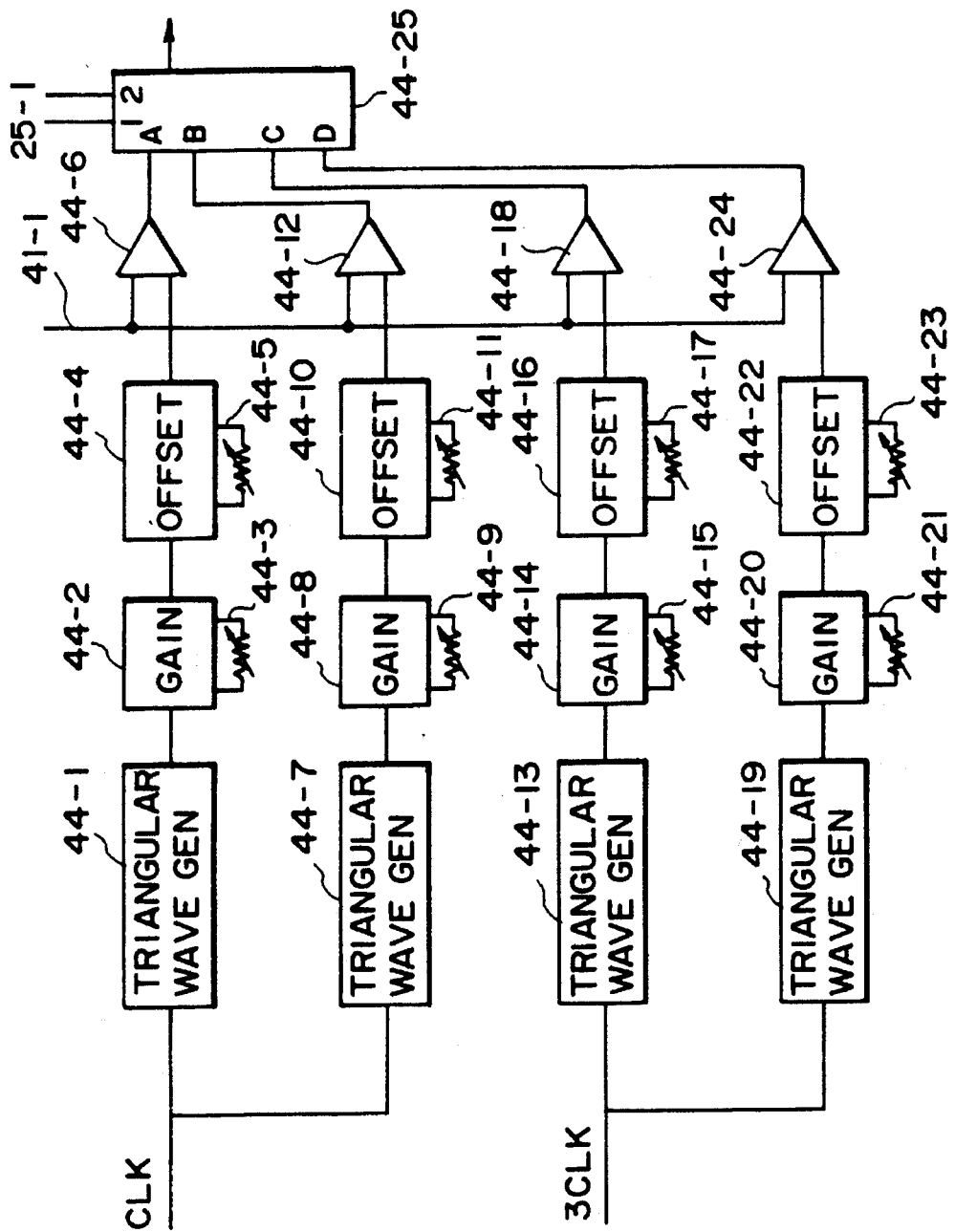
FIG. 16 is a block diagram of a binary digitizing circuit 44.

The analog image signal 41-1 thus obtained is binary encoded by a binary encoding circuit 44, of which an example is shown in FIG. 16. In response to a clock signal 51 released from the synchronization control unit 31, triangular wave generators 44-1, 44-7, 44-13 and 44-19 generate triangular waves, which are subjected to the regulation of gain level and offset set by variable resistors 44-3, 44-9, 44-15, 44-21, 44-5, 44-11, 44-17 and 44-23 and are compared with the analog image signal 41-1 in comparators 44-6, 44-12, 44-18 and 44-24 to obtain pulse-width modulated signals for supply to inputs A–D of a selector 44-25.

FIG. 14-2 shows the relation between the released pulse width and the amount of laser beam emission. In order to fully utilize the linear portion of the characteristic curve corresponding to the hexadecimal levels ($00_H$–$FF_H$) of the image signal, the aforementioned variable resistors for regulating the gain and offset levels are manually regulated in cooperation with an energy measuring device provided in the optical path, in such a manner that the level $00_H$ corresponds to the initial position of the linear portion and the level $FF_H$ corresponds to a position immediately before the end of said linear portion.

However the laser current becomes different when the laser power is switched as will be explained later. As the laser element starts light emission above a predetermined threshold current, the amount of light emission becomes different even with a same pulse duration as shown in FIG. 14-1. Consequently, when the laser power is varied, the linear range of the amount of light emission as a function of the pulse duration supplied to the laser driver 22 varies depending on the laser power, as indicated by curves (1) and (2) in FIG. 14-2, respectively corresponding to higher and lower laser power levels.

Therefore, in order to obtain a same image density from a same image signal with a varied amount of laser light emission, it becomes necessary to regulate the pulse duration in response to the change in the amount of light emission. This is achieved, in the present embodiment, by employing a number of binary encoding circuits corresponding to the number of switched levels of the laser power. Though the present embodiment employs plural digitizing circuits as shown in FIG. 16, it is also possible to use selectively plural circuits for controlling the gain and offset levels.

Also plural binary encoding circuits for the switched levels of the laser power are also provided for a clock signal 3CLK 52 of a frequency different from that of the clock signal 51 from the synchronization control unit 31. The selector 44-25 selects one of plural pulse-width modulated binary image signals according to a signal from the CPU 25-1.

The image signal pulse-width modulated by the binary encoding circuit 44 is supplied, through an OR gate 45 and an AND gate 46, to the laser driver 22.

FIG. 15 shows the details of said laser driver 22, in which an analog switch 22-7 is controlled according to the information discriminated by the control unit 25, thereby varying the constant current supplied to the laser element 23, as will be explained in more detail in the following.

The signal from the AND gate 46 of the tone control circuit 21 is supplied, through a buffer 22-1 in the laser driver 22, to a transistor 22-2 constituting a differential circuit, of which the other transistor 22-3 is used for driving the laser element 23. These transistors are given a constant current by a transistor 22-4. An operational amplifier 22-5 receives, at the positive input terminal thereof, a signal supplied from a constant voltage source 22-6, and, at the negative input terminal thereof, a voltage across a resistor R5 for detecting the current in the transistor 22-4, and supplies the transistor 22-4 with a voltage for causing a constant current. On the other hand, an analog switch 22-7 controlled by a buffer 22-8 receiving an I/O signal from the control unit 25, varies the voltage supplied to the positive input terminal of the operational amplifier 22-5, thereby varying the current supplied to the laser element 23. In this manner the analog switch 22-7 is controlled according to the humidity information, thereby switching the current to be supplied to the laser element.

If the point (a) is left open even momentarily at the voltage switching, the output of the operational amplifier increases to elevate the current without limit, thereby eventually leading to the destruction of the semiconductor laser. The analog switch is provided for preventing such phenomenon.

A blanking signal 48 from the synchronization control unit 31 is used for turning on the laser element 23 for enabling the beam detector to detect the arrival of the beam. An inhibit signal 49 from the CPU 25-1 is used for inhibiting the function of the laser element 23, thereby extending the service life thereof.

A pattern generator 50 generates a predetermined pattern for checking the image signal, and, it receives a transfer drum synchronization signal ITOP, the horizontal synchronization signal HSYNC of the printer 200 and a control signal from the CPU 25-1. When said pattern signal is released, the CPU 25-1 shifts the selection signal 42 for the selector 40 to the input B, thereby supplying the signal of the pattern generator 50 to the D/A converter 41 and thus checking the image signal.

The synchronization control unit 31 releases a clock signal CLK 51 or 3CLK 52 for generating a triangular wave based on a reference clock signal from a crystal oscillator in response to an instruction from the CPU 25-1. It also receives the beam detection signal from the beam detector 20, and releases the blanking signal 48, the horizontal synchronization signal HSYNC of the printer 200, and the image clock signal CLK. The binary encoding circuit 44 releases a binary encoded signal 47 in synchronization with the CLK signal 51 or the 3CLK signal 52.

FIG. 3 is a timing chart showing the timing of said beam detection signal and blanking signal 48.

The synchronization control unit 31 receives a clock signal, from a crystal oscillator, of a frequency larger than twice that of the image clock signal, and releases the signals HSYNC and CLK in synchronization with the beam detection signal and said clock signal. The blanking signal 48 is formed by a counter which is reset at the end of the beam detection signal BD and measures a period shorter than the period of said beam detection signal BD.

Figure 4:
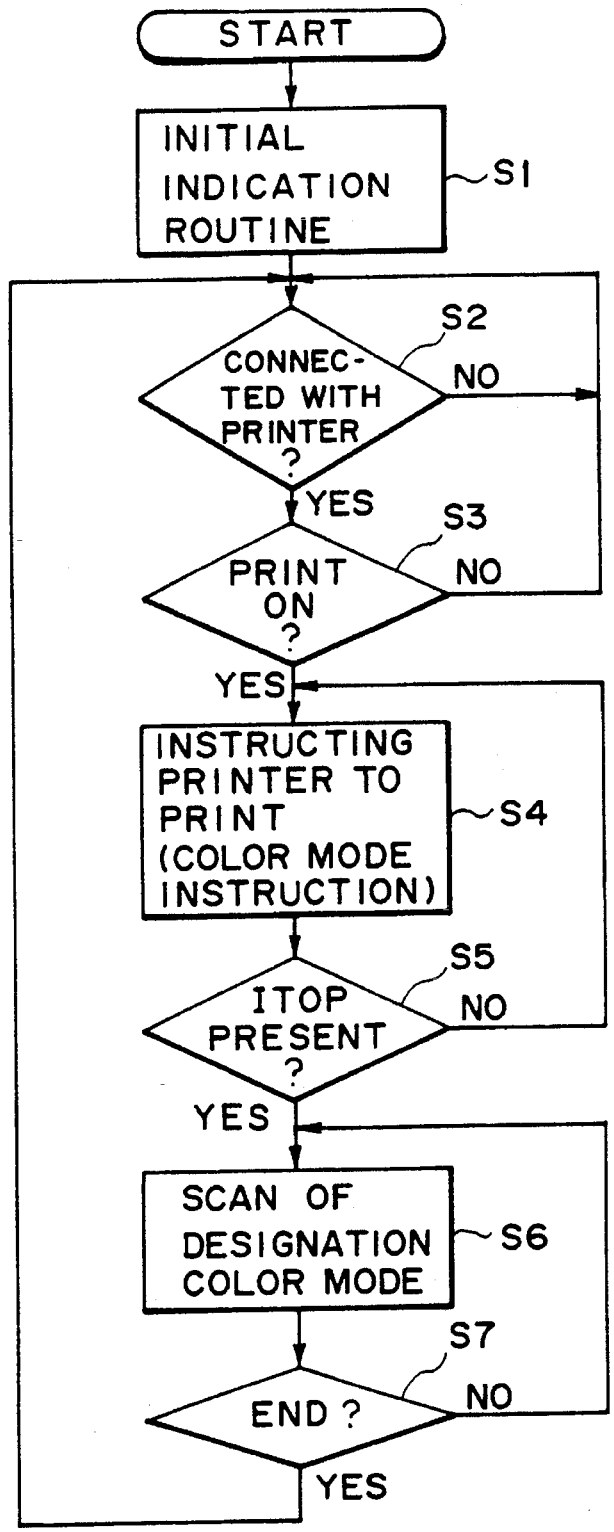
FIG. 4 is a flow chart of the control sequence of a control unit in a reader unit.

Explanation of function of the reader unit (FIG. 4)

FIG. 4 is a flow chart showing the function of the CPU 10-1 of the control unit 10 of the reader 100, and a corresponding program is stored in the ROM 10-2 shown in FIG. 1A.

When the power supply to the reader 100 is started, a step S1 executes an initial display routine, including the checking of input/output states, initialization of the RAM 10-3 in FIG. 1A and movement of the scanning start point. Then a step S2 detects whether the reader 100 is connected with the printer 200. A Step S3 discriminates whether a print switch in the operation unit 16 has been actuated, and, if actuated, a step S4 sends a print-on command to the printer 200. Then a step S5 awaits the entry of the signal ITOP from the printer 200, and, upon entry thereof, a step S6 initiates the scanning of the original image with a designated color mode and sends the image signal to the printer 200.

Explanation of function of the printer (FIG. 5)

Figure 1B:
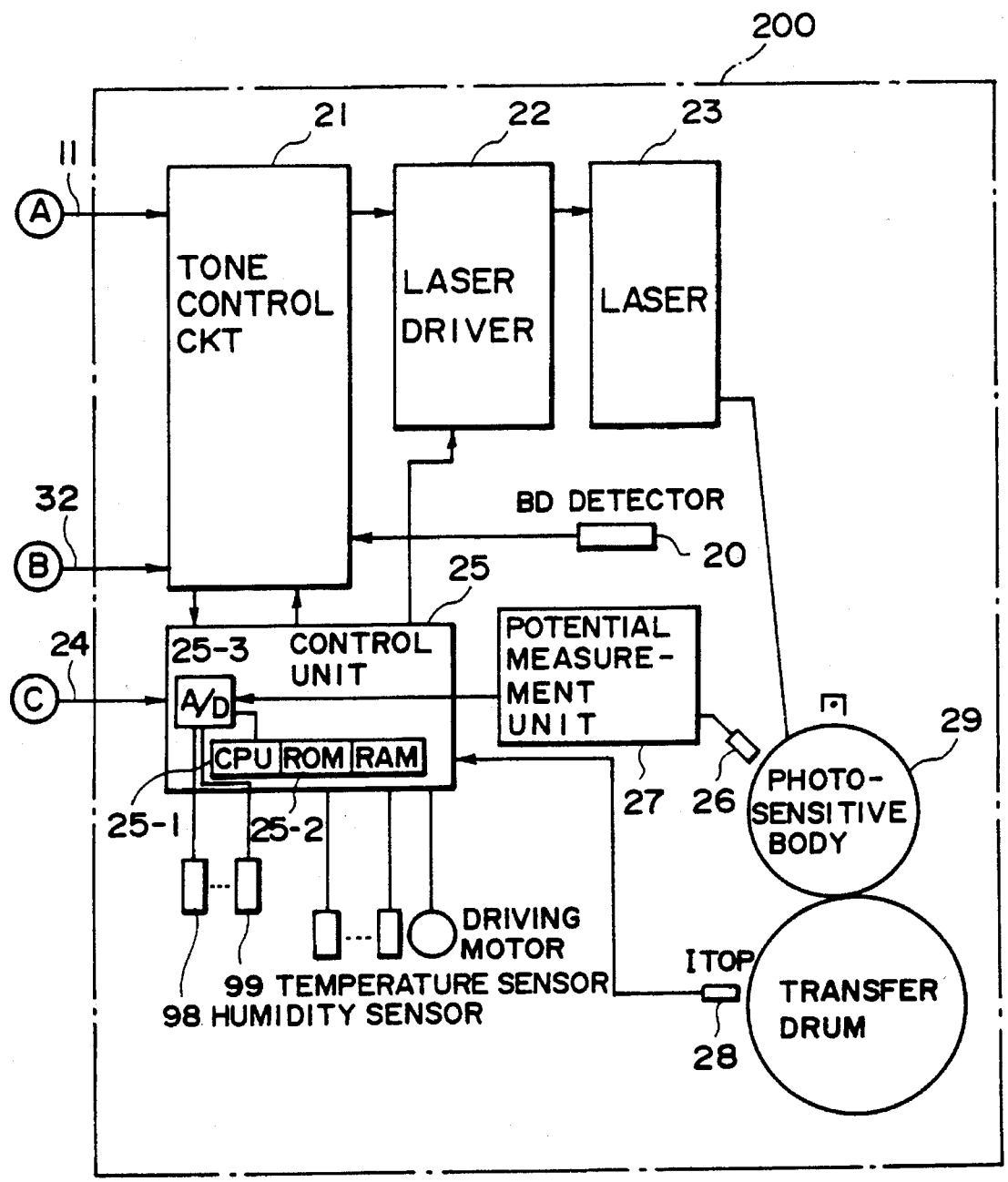

FIG. 5 is a flow chart of the control sequence of the control unit 25 of the printer 200, and a corresponding program is stored in the ROM 25-2 shown in FIG. 1B.

When the power supply to the printer 200 is initiated, a step S10 executes an initial routine, including the checking of input/output states, initialization of the RAM and removal of any retentive charge on the photosensitive drum. A step S11 then checks the connection with the reader 100, and, when said connection is confirmed, a step S12 discriminates whether the heater of the fixing unit has been warmed up to a predetermined temperature. Upon completion of the warming-up, a step S13 discriminates whether a print command has been sent from the reader 100. In response to a print command, a step S14 (S14-1–S14-4) executes a process PGON to be explained later, respectively for the clock signals used for generating the triangular wave and for controlling the laser power.

A step S15 calculates the data to be stored in the LUTRAM 38 according to the humidity data and the character/photograph information (data for selecting the clock signal CLK or 3CLK) from the reader, based on the result of the step S14 as will be explained later. The clock signal CLK or 3CLK is selected respectively for the character information or the photograph information. The calculated data are stored in the LUTRAM 38 in a step S16, by selecting the input terminal B of the selector 33 by the selection signal 34 and connecting a data bus 36 of the CPU 25-1 through the selector 39 to the data input terminal of the LUTRAM 38. The CPU 25-1 releases the address of the LUTRAM 38 to an address bus 35 and the data to be stored to a data bus 37, and the storage into the LUTRAM 38 is conducted by the entry of writing pulses in response to the control signal 36.

Then a step S17 discriminates whether the storage in the LUTRAM 38 has been completed, and, if completed, a step S18 sends the signal ITOP to the reader 100. In response to said signal, in the flow chart shown in FIG. 4, the sequence proceeds from the step S5 to S6. Then a step S19 sets a designated color mode, and the tone control is executed by switching the address of the LUTRAM 38 for each color. A step S20 executes a printing operation of the designated color. Upon completion of a designation color mode of color image formation, the sequence returns to the step S11.

Figure 6:
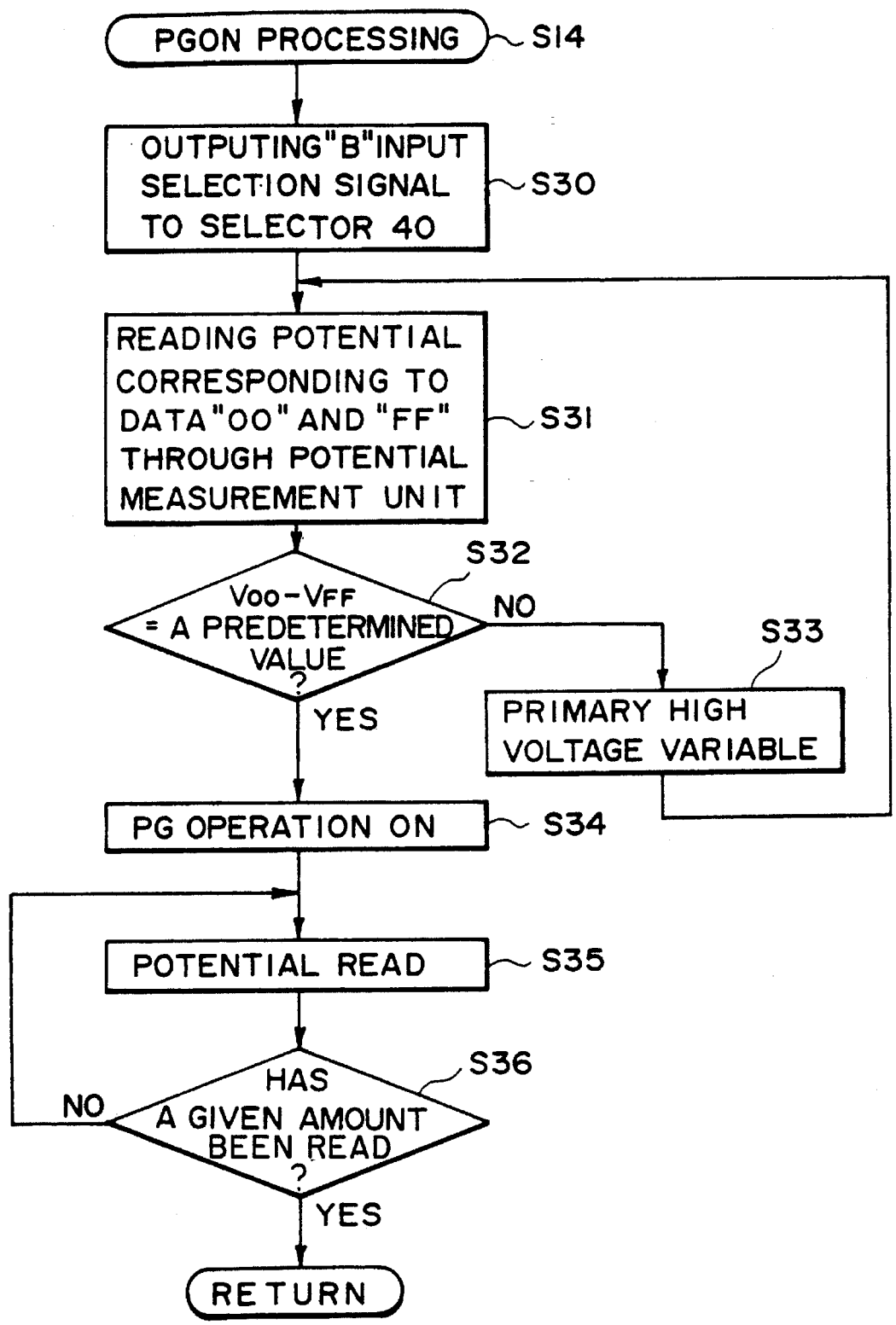
FIG. 6 is a flow chart of the control sequence for data output of a pattern generator and potential reading.
Figure 7:
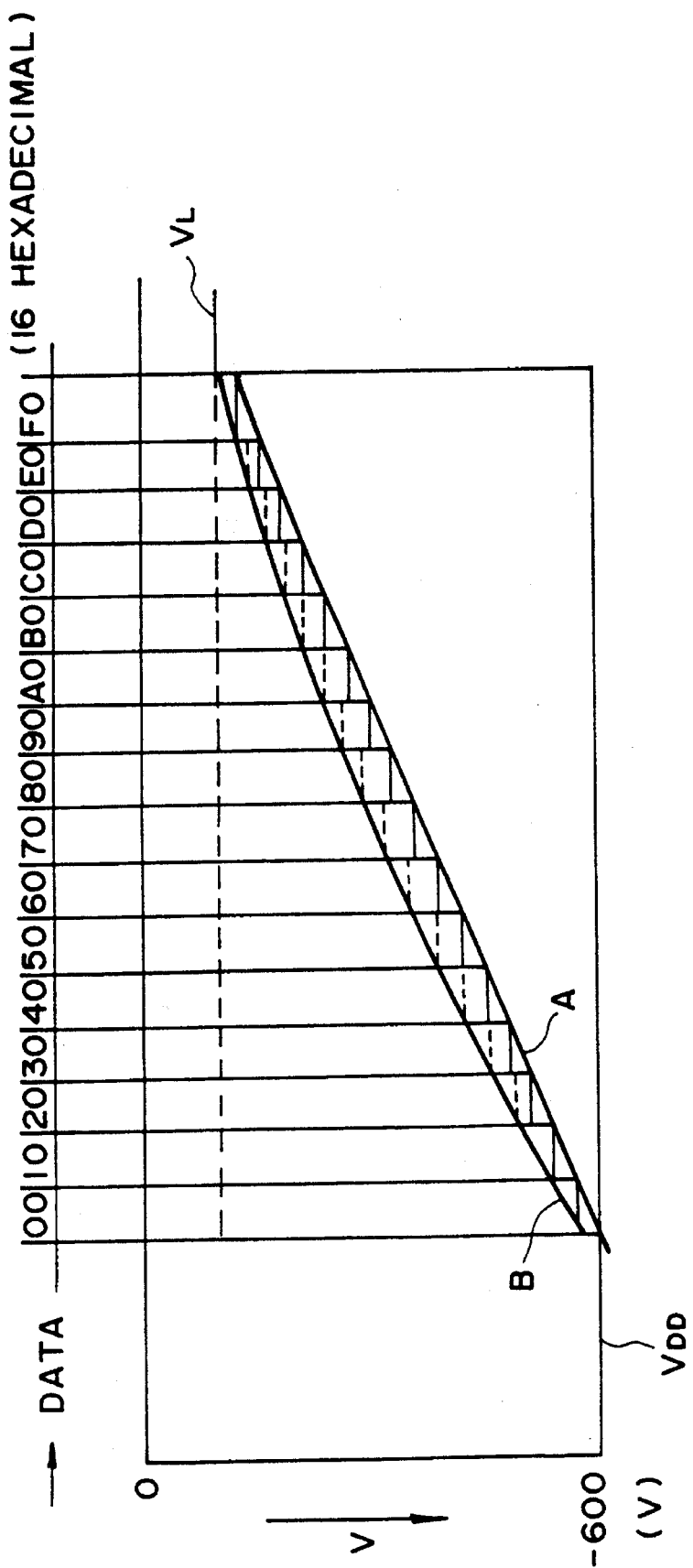
FIG. 7 is a chart showing the relation between output data of the pattern generator and the potential of a photosensitive member.

Explanation of PGON process (FIGS. 6 and 7)

The PGON processes in the steps S14-1 to S14-4 are summarized in FIG. 6 as they are the same except for the laser power and the clock signal used for generating the triangular wave.

FIG. 6 is a flow chart of the PGON process in the step S14 in FIG. 5, for activating the pattern generator 50 to release a predetermined pattern and reading the surface potential of the photosensitive drum.

At first a step S30 causes the selection signal 42 to select the input terminal B of the selector 40, for supplying the signal of the pattern generator 50 to the D/A converter 41. Then a step S31 causes the potential measuring unit 27 to measure the potential which is generated on the photosensitive drum 29 by a laser beam emitted in response to a signal, for example "00", from the pattern generator 50. The binary digitizing circuit 44 is so adjusted in advance that the comparators 44-6, 44-12, 44-18 and 44-24 release a limit pulse enough for inducing light emission from the laser element in response to a "0" input signal to the D/A converter 41. Thus the photosensitive member 29 is uniformly irradiated by the laser driver 22 and laser element 23.

Also the binary encoding circuit 44 is so adjusted in advance that the laser element 23 emits light with a period shorter than the period of the triangular wave, thereby exactly reproducing dots when the pattern generator 50 releases a hexadecimal signal "FF" in the step S31, and the potential corresponding to said signal "FF" is read in the same manner.

A step S32 determines the target surface potential $V_{CO}$ from FIG. 10 in order to provide a predetermined image density in response to the detected humidity, and discriminates whether the difference of the measured potentials $V_{00}$ and $V_{FF}$ respectively corresponding to the signals "00" and "FF" from the pattern generator 50 is equal to a predetermined value. If not, the sequence proceeds to a step S33 for varying the high voltage of the charger 97 shown in FIG. 1, and the sequence returns to the step S31 for repeating the procedure.

On the other hand, if said difference in the step S32 is equal to $V_{CO}$, the sequence proceeds to a step S34 for activating the pattern generator 50, whereupon the pattern generator 50 starts to function as an m-bit counter for counting the HSYNC signal in synchronization with the ITOP signal, and releases signals in succession, by dividing the signals "00" to "FF" into a predetermined number m of levels. The signal thus obtained is supplied through the selector 40 to the D/A converter 41 for obtaining an analog signal for driving the laser element 23. Steps 35 and 36 read the potential of the photosensitive member 29 varying in m levels in response to said analog signal, and store said potential in succession corresponding to the output signal of the pattern generator 50. In the present embodiment said number m is taken as 16.

FIG. 7 shows the relation between the input signal of the D/A converter 41 and the voltage measured by the potential measuring unit 27.

The photosensitive member 29 is charged to a negative potential, so that the potential is elevated by the irradiation with a laser beam, and negatively charged toner is correspondingly deposited. In FIG. 7, $V_{DD}$ indicates a charge level when the laser is not activated, and $V_L$ indicates a charge level when the laser is fully activated.

In the present embodiment, the PGON process is executed, prior to every copying sequence, for all the laser power levels and the clock signal for generating the triangular wave, but said process may be conducted at a predetermined interval with a suitable timer, or after a predetermined number of copying operations. Also it may be conducted for a selected laser power level and a selected clock signal.

It is furthermore possible to employ the exclusive sequence for the PGON process to store the measured values, and to prepare a look-up table by means of the stored data at the ordinary copying sequence.

Figure 12:
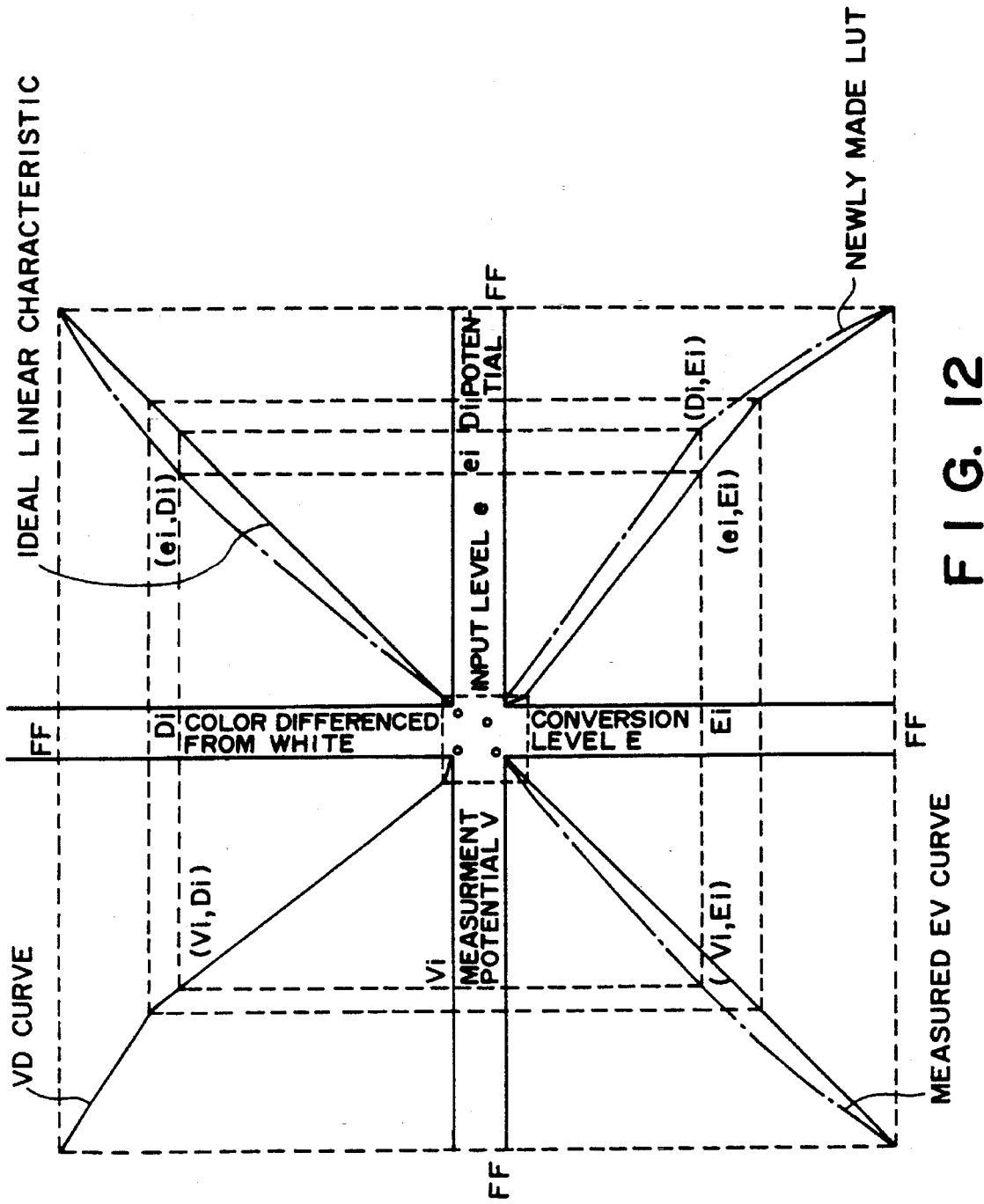
FIG. 12 is a chart showing the relation between input image signal and output image density.

Preparation of look-up table (step 21) (FIG. 12)

FIG. 12 shows the relationship between the input image signal and the output image density wherein;

1st quadrant indicates the output density D as a function of the input level e;

2nd quadrant indicates the relation (LUT) between the conversion level E and the input level e;

3rd quadrant indicates the relation (EV curve) between the conversion level E and the potential V measured by the potential sensor; and 4th quadrant indicates the relation (VD curve) between the output density D and the measured potential V; wherein:

V=(value measured by potential sensor—$V_{FF}$)/($V_{00}-V_{FF}$)

D=(density/maximum density)×"FF"

$V_{00}$: potential measured by potential sensor in response to a signal "00"

$V_{FF}$: potential measured by potential sensor in response to a signal "FF".

The VD curve is selected from plural curves stored in advance in the ROM 25-2 according to the developer, laser power levels and the clock signals for generating triangular wave for use in the binary encoding circuit 44 in FIG. 12 (clock signals CLK 51, 3CLK 52).

Since the EV curve is almost linear, the PG process for potential measurement (step S34 in FIG. 6) is conducted by storing a table corresponding to the selected VD-curve (table with inverted x- and y-axes of the VD-curve) in the LUTRAM 38, and utilizing the data converted by the table in the LUTRAM 38. Said data stored in the LUTRAM 38 may also be stored in advance in a ROM.

The preparation of the look-up table is conducted in such a manner that a conversion level Ei is obtained corresponding to the input level ei and the density level Di, in order that the output density D varies linearly as a function of the input level e, wherein the output ei of the pattern generator provides a measured potential Vi corresponding to a density Di according to the VD curve. As the output of the pattern generator is varied in 16 levels in the present embodiment, there are prepared 16 LUT data, and said data are completed from "00" to "FF" by approximation with folded lines.

In the foregoing embodiment the look-up table is formed in a RAM, but it is also possible to store plural data groups in a ROM and to select a suitable group according to the result of calculation by the CPU.

As explained before, the foregoing embodiment allows a stable image to be obtained by maintaining a constant relationship between the potential on the photosensitive member and the image signal and also taking the characteristics of the developer into consideration. Also in case of a color image, it allows the prevention of fluctuation in colors, thereby providing an image with constant color.

Though the foregoing description has been directed to a color image forming apparatus in which a laser and an electrophotographic process are combined, the present invention is not limited to such embodiments. In fact the present invention is subject to various modifications within the scope and spirit of the appended claims.

What is claimed is:

1. An image forming apparatus comprising:

plural process means each for effecting binary digitizing according to image data;

image forming means for forming an image on a recording member according to the data released from said plural process means, comprising exposure means for exposing said recording member to light;

switch means for switching the amount of light of said exposure means; and selector means for selecting one of said plural process means, corresponding to the switched amount of light, according to the switching operation of said switch means.

2. An image forming apparatus according to claim 1, wherein said process means comprises signal generator means for generating a predetermined analog pattern signal, and comparator means for comparing the analog image signal with said analog pattern signal.

3. An image forming apparatus according to claim 2, wherein said image forming means is adapted to form a dot image on said recording member by modulating said exposure means according to the output of said comparator means.

4. An image forming apparatus according to claim 2, wherein said signal generator means comprises regulator means for regulating the gain of said analog pattern signal.

5. An image forming apparatus according to claim 2 or 4, wherein said signal generator means comprises regulator means for regulating the offset level of said analog pattern signal.

6. An image forming apparatus according to claim 1, wherein said switch means is adapted to detect circumferential conditions in said apparatus and to switch the amount of light of said exposure means according to the value of said detection.

7. An image forming apparatus according to claim 6, wherein said circumferential condition is the condition of humidity.

8. An image forming apparatus comprising:

converter means for converting input digital image data according to conversion information;

plural output means for releasing an image signal by applying a predetermined process to a signal corresponding to the thus-converted image data;

exposure means for forming an image on a recording member according to said image signal;

selector means for selecting one of said plural output means, said selector means comprising switch means for switching the energy of said exposure means, and said selector means being adapted to select said one of said plural output means in response to the function of said switch means; and control means for varying said conversion information according to the output means selected by said selector means.

9. An image forming apparatus according to claim 8, wherein said switch means comprises first detector means for detecting circumferential conditions and second detector means for detecting the surface potential of said recording member, and is adapted to switch the energy of said exposure means according to the outputs of said first and second detector means.

10. An image forming apparatus according to claim 9, wherein said first detector means is adapted to detect the humidity condition in said apparatus.

11. An image forming apparatus according to claim 8, wherein said output means comprises signal generator means for generating a predetermined analog pattern signal and comparator means for comparing said analog pattern signal with an analog signal corresponding to image data released from said converter means.

12. An image forming apparatus according to claim 8, wherein said converter means comprises memory means storing said conversion information.

13. An image forming apparatus according to claim 12, wherein said control means is adapted to form a predetermined pattern on said recording member by means of selected output means, to detect the surface state corresponding to said pattern, and to vary said conversion information according to the result of said detection.

14. An image forming apparatus comprising:

converter means for converting input digital image data into a converted image data according to conversion information;

output means for releasing the converted image data as an image signal;

said output means comprising means for D/A conversion of said converted image data, means for generating an analog reference signal of a predetermined cycle period, and comparator means for comparing an analog image signal released from said D/A converter means with said analog reference signal to generate a pulse-width modulated signal;

exposure means for forming an image on a recording member according to said image signal;

switch means for switching the energy of said exposure means; and regulator means for regulating the image signal released from said output means, said regulator means being adapted to regulate a gain or offset level of said analog reference signal.

15. An image forming apparatus according to claim 14, wherein said exposure means comprises a laser element.

16. An image forming apparatus comprising:

converter means for converting input digital image data according to conversion information;

output means for releasing an image signal by selecting the thus-converted image data;

exposure means for forming an image on a recording member according to said image signal;

monitor means for monitoring gradation data by varying an image data level and image forming parameters;

control means for varying said conversion information according to gradation data detected by said monitor means; and switch means for switching energy of said exposure means, and wherein said image forming parameter comprises the energy of said exposure means.

17. An image forming apparatus according to claim 16, wherein said output means comprises means for D/A conversion of said converted image data; means for generating an analog signal of a predetermined cycle period; reference signal generator means for generating a reference signal for forming said analog signal; and comparator means for comparing an analog image signal released from said D/A converter means with said analog reference signal to generate a pulse-width modulated signal.

18. An image forming apparatus according to claim 17, wherein said exposure means comprises a laser element.

19. An image forming apparatus according to claim 17, wherein said reference signal generator means is adapted to generate reference signal of different cycle periods for generating said analog signals of different cycle period, and said image forming parameter further comprises the cycle period of said reference signal.

20. An image forming apparatus according to claim 19, wherein said exposure means comprises a laser element.

21. An image forming apparatus according to claim 16, wherein said exposure means comprises a laser element.

22. An image forming apparatus according to claim 16, wherein said control means comprises detector means for detecting the surface potential of said recording member, and is adapted to form a predetermined pattern on said recording member according to a selected image forming parameter, and to detect the surface potential of said pattern by said detector means thereby obtaining said gradation data.

23. An image forming apparatus according to claim 22, wherein said exposure means comprises a laser element.

24. A color image forming apparatus comprising:

input means for entering a color image signal;

image forming means for performing an image formation of a plurality of colors including a half tone;

means for generating pattern signals each related to plural steps of half tone on each of the plurality of colors;

generating means for supplying the pattern signals to said image forming means;

detecting means for detecting on a step basis levels of an image which have been formed by said image forming means in accordance with the pattern signal supplied from said generating means; and correcting means for correcting the color image signal entered from said input means on each color in accordance with a detection result by said detecting means and for supplying the corrected signals to said image forming means, wherein said correcting means includes a reference table for storing output values to the color image signal entered from said input means, and varies the output value to be read out from said reference table in accordance with a detection result of said detecting means.

25. A color image forming apparatus according to claim 24, wherein said image forming means includes a laser generator, a photoconductive member, and means for modulating a pulse width of a laser beam generated by said laser generator in accordance with levels of the color image signal entered from said input means, the pattern signals generated from said generating means being varied in pulse width on each step.

26. An apparatus according to claim 25, wherein said detecting means detects a surface potential on the photoconductive member.

27. An image forming apparatus, comprising:

converter means for converting input digital image data in accordance with conversion formation;

output means for applying a predetermined process to a signal corresponding to the thus-converted image data and outputting the processed signal as an image signal;

exposure means for forming an image on a recording medium in accordance with the image signal;

detector means for detecting an environmental condition;

switching means for switching an energy of said exposure means according to an output of said detector means; and control means for varying the conversion information of said converter means in accordance with the output of said detector means.

28. An apparatus according to claim 27, wherein said control means is adapted to vary the conversion information based on the energy selected by said switching means in accordance with the output of said detector means.

29. An apparatus according to claim 27, wherein said detector means is adapted to detect the humidity condition in said apparatus.

30. An apparatus according to claim 27, wherein said output means comprises (1) signal generator means for generating a predetermined analog pattern signal, and (2) comparator means for comparing said analog signal with an analog signal corresponding to image data output from said convertor means.

31. An apparatus according to claim 27, wherein said converter means comprises memory means for storing said conversion information.

* * * * *